US009823150B2

(12) United States Patent
Cai et al.

(10) Patent No.: US 9,823,150 B2
(45) Date of Patent: Nov. 21, 2017

(54) MICRO-MACHINED OPTICAL PRESSURE SENSORS

(71) Applicants: AGENCY FOR SCIENCE, TECHNOLOGY AND RESEARCH, Singapore (SG); NANYANG TECHNOLOGICAL UNIVERSITY, Singapore (SG)

(72) Inventors: Hong Cai, Singapore (SG); Jifang Tao, Singapore (SG); Julius Ming-Lin Tsai, Singapore (SG); Aiqun Liu, Singapore (SG)

(73) Assignees: Agency for Science, Technology and Research, Singapore (SG); Nanyang Technological University, Singapore (SG)

( * ) Notice: Subject to any disclaimer, the term of this patent is extended or adjusted under 35 U.S.C. 154(b) by 0 days.

(21) Appl. No.: 15/036,792

(22) PCT Filed: Nov. 14, 2014

(86) PCT No.: PCT/SG2014/000536
§ 371 (c)(1),
(2) Date: May 13, 2016

(87) PCT Pub. No.: WO2015/080663
PCT Pub. Date: Jun. 4, 2015

(65) Prior Publication Data
US 2016/0273980 A1 Sep. 22, 2016

(30) Foreign Application Priority Data
Nov. 27, 2013 (SG) .................................. 201308805

(51) Int. Cl.
*G01L 1/24* (2006.01)
*G01L 11/02* (2006.01)
*G01L 9/00* (2006.01)

(52) U.S. Cl.
CPC .......... *G01L 11/025* (2013.01); *G01L 9/0076* (2013.01)

(58) Field of Classification Search
CPC ........ G01L 9/0076; G01L 11/025; G02B 6/26
(Continued)

(56) References Cited

U.S. PATENT DOCUMENTS 4,775,214 A   10/1988 Johnson
6,901,101 B2 * 5/2005 Frick .................. G01D 5/35312
                                                    250/227.14
(Continued)

FOREIGN PATENT DOCUMENTS

WO   WO 2013/136072 A1   9/2013

OTHER PUBLICATIONS

PCT Notification of Transmittal of the International Search Report and the Written Opinion of the International Searching Authority, or the Declaration for PCT Counterpart Application No. PCT/SG2014/000536, 10 pp., (dated Feb. 3, 2015).
(Continued)

*Primary Examiner* — Max Noori
(74) *Attorney, Agent, or Firm* — Blakely, Sokoloff, Taylor & Zafman LLP

(57) ABSTRACT

A micro-machined optical pressure sensor, comprising: a diaphragm configured to deform when a force is applied thereto; and a sensing micro-ring spaced apart from the diaphragm by a gap, the gap being variable depending on the force applied on the diaphragm, wherein the sensing micro-ring is configured to produce a resonance wavelength shift
(Continued)

when the gap is varied, the resonance wavelength shift indicative of the force applied to the diaphragm.

17 Claims, 7 Drawing Sheets

(58) Field of Classification Search
USPC .................................. 73/862.624; 333/219
See application file for complete search history.

(56) References Cited

U.S. PATENT DOCUMENTS

| | | | |
|---|---|---|---|
| 7,043,115 B2 * | 5/2006 | Frick | B82Y 20/00 333/219.1 |
| 2005/0063444 A1 | 3/2005 | Frick | |
| 2011/0302694 A1 * | 12/2011 | Wang | A61B 5/103 2/160 |
| 2013/0261010 A1 * | 10/2013 | Bailey | G01N 27/72 506/9 |
| 2014/0029893 A1 * | 1/2014 | Liu | G02B 6/262 385/27 |
| 2015/0338251 A1 * | 11/2015 | van Neer | G01L 1/246 600/424 |

OTHER PUBLICATIONS

PCT Notification of Transmittal of International Preliminary Report on Patentability (Chapter II of the Patent Cooperation Treaty) for PCT Counterpart Application No. PCT/SG2014/000536, 13 pp., (dated Mar. 24, 2016).

B. Dong, et al., "Nano-Opto-Mechanical (NOM) Acoustic Wavefront Sensor via Ring Resonators", 2013 Transducers & Eurosensors XXVII: The 17$^{th}$ International Conference on Solid-State Sensors, Actuators and Microsystems, Barcelona, Spain, pp. 2333-2336, (Jun. 16-20, 2013).

Prasant Kumar Pattnaik, et al., "Optical MEMS Pressure Sensor using Ring Resonator on a Circular Diaphragm", Proceedings of the 2005 International Conference on MEMS, NANO and Smart Systems (ICMENS'05), pp. 277-280, (Jul. 24-27, 2005).

Gregory N. De Brabander, et al., "Integrated Optical Ring Resonator with Micromechanical Diaphragm for Pressure Sensing", IEEE Photonics Technology Letters, vol. 6, No. 5, pp. 671-673, (May 1994).

E. Hallynck, et al., "Integrated Optical Pressure Sensors in Silicon-on-Insulator", IEEE Photonics Journal, vol. 4, No. 2, pp. 443-450, (Apr. 3, 2012).

* cited by examiner

| Diaphragm dimension (SiN) | Spring constant | Range | Function: $\Delta\lambda=f(P)$ | Sensitivity: $d(\Delta\lambda)/dP$ |
|---|---|---|---|---|
| 500μm × 500μm × 10μm | 0.21 kPa/nm | 0 – 42 kPa | A=0.37; C=-0.35; k=11.28 | > 33 pm/kPa |
| 300μm × 300μm × 10μm | 1.9 kPa/nm | 0 – 380 kPa | A=0.37; C=-0.35; k=101.02 | > 3.7 pm/kPa |
| 300μm × 300μm × 20μm | 13.5 kPa/nm | 0 – 2.7 MPa | A=0.37; C=-0.35; k=720.38 | > 0.5 pm/kPa |

| Type | Wavelength drift @ 600 °C | TOE | Sensitivity | Induced error without temperature controller |
|---|---|---|---|---|
| Single-ring | 62.93 nm | 104.88 pm/°C | 33 pm/kPa | < 330% |
| Double-ring | 0.24 nm | 0.4 pm/°C | 33 pm/kPa | < 1.1% | ium
MICRO-MACHINED OPTICAL PRESSURE SENSORS

CROSS-REFERENCE TO RELATED APPLICATIONS

This patent application is a U.S. National Phase Application under 35 U.S.C. §371 of International Application No. PCT/SG2014/000536, filed Nov. 14, 2014, entitled MICRO-MACHINED OPTICAL PRESSURE SENSORS, which claims priority to Singapore Patent Application No. 201308805-9, filed Nov. 27, 2013.

TECHNICAL FIELD OF INVENTION

The following relates to micro-machined optical pressure sensors.

BACKGROUND

With significant developments in micromachining technology, micro-electro-mechanical systems (MEMS) and nano-opto-mechanical systems (NOMS) have shown immense potential for sensor applications, which have advantages such as small size, low power packages and relative inexpensiveness. For example, optical MEMS pressure sensors based on Fabry-Perot interferometry have been reported. Compared to other MEMS sensing techniques such as piezoelectric, piezoresistive or capacitive, optical micromachined sensing devices operate by monitoring light properties, such as intensity or wavelength spectrum.

Optical sensors provide distinct advantages over capacitive-type and piezoresistive-type sensors, including: high sensitivity, immunity to electromagnetic interference (EMI), less read-out electronic complexity, low power consumption, easy telemetry applications, resistance to harsh environments, and capability for multiplexing.

There are two commonly employed sensing schemes for optical sensors, the first is by measuring the output intensity change at a certain wavelength and the second is by monitoring the resonance wavelength shift.

In Mach-Zehnder interferometer (MZI) based pressure sensors, due to applied pressure, phase change on the sensing arm of the MZI can be obtained as intensity changes. In Fabry-Perot interferometer based pressure sensors, variations in cavity length due to the displacement of the diaphragm when pressure is applied can be obtained in terms of intensity variations. However, intensity interrogation typically has limited sensitivity. High detection sensitivity can be obtained by measuring intensity change at a fixed wavelength at the resonance peak of a high-Q resonator, but the light source needs to have a very accurate wavelength with a narrow bandwidth and high stability, which is difficult to achieve in practice. On the other hand, sensing schemes based on wavelength interrogation, i.e., measurement of the spectral shift of the resonance wavelengths, can be used with a high sensitivity.

Micro-ring resonators (especially Si micro-rings) have found numerous applications, which offer high quality factor (Q) and a compact size making such structures attractive for telecommunications and sensing applications. Micro-ring resonator based sensors use a wavelength-shift scheme, which is very useful for simultaneously reducing noise and enhancing sensitivity. Optical sensors are particularly viable for silicon photonics since crystalline silicon has superior optical properties, including high refractive index and low optical loss, which are not attainable with plastic materials.

For Si waveguide-based sensors, the evanescent optical field expanded outside the Si waveguide can sense the surrounding variations. Moreover, devices having a ring-resonator configuration can further amplify the sensing response as light circulating inside the ring effectively and multiply interacts with the surroundings. Furthermore, high quality factor (Q) ring resonators have a longer effective interaction length with the surroundings, leading to an increase in sensitivity.

A need therefore exists to provide micro-machined optical pressure sensors that seek to address at least the above-mentioned problems.

SUMMARY

According to an aspect of the invention, there is provided a micro-machined optical pressure sensor, comprising: a diaphragm configured to deform when a force is applied thereto; and a sensing micro-ring spaced apart from the diaphragm by a gap, the gap being variable depending on the force applied on the diaphragm, wherein the sensing micro-ring is configured to produce a resonance wavelength shift when the gap is varied, the resonance wavelength shift indicative of the force applied to the diaphragm.

In an embodiment, the micro-machined optical pressure sensor may further comprise a reference micro-ring spaced apart from the sensing micro-ring, the reference micro-ring may be configured to produce a reference resonance wavelength shift, the reference resonance wavelength shift indicative of the temperature of the sensor.

In an embodiment, an effective resonance wavelength shift may be derived from the resonance wavelength shift and the reference resonance wavelength shift, the effective resonance wavelength shift indicative of the force applied on the diaphragm independent of the temperature of the sensor.

In an embodiment, the micro-machined optical pressure sensor may further comprise a waveguide, wherein the sensing micro-ring and the reference micro-ring may be in optical communication with the waveguide.

In an embodiment, the micro-machined optical pressure sensor may further comprise a broadband light source in optical communication with the waveguide for providing an optical spectrum from which the resonance wavelength shift and the reference resonance wavelength shift are derived.

In an embodiment, the micro-machined optical pressure sensor may further comprise a substrate, wherein the sensing micro-ring and the waveguide may be fixedly disposed within the substrate such that the spacing between the sensing micro-ring and the waveguide does not vary when force is applied to the diaphragm.

In an embodiment, the substrate may comprise $SiO_2$; and the diaphragm may comprise $Si_3N_4$ or $SiO_2$.

In an embodiment, the substrate may comprise a leakage channel for air pressure balance.

In an embodiment, the micro-machined optical pressure sensor may further comprise an auxiliary waveguide, wherein the sensing micro-ring is in optical communication with the auxiliary waveguide. In this case, the broadband light source may be in optical communication with both the waveguide and the auxiliary waveguide for providing an optical spectrum from which the resonance wavelength shift and the reference resonance wavelength shift are derived. The sensing micro-ring, the waveguide and the auxiliary waveguide may be fixedly disposed within the substrate such that the spacings between the sensing micro-ring, the waveguide and the auxiliary waveguide do not vary when force is applied to the diaphragm.

BRIEF DESCRIPTION OF THE DRAWINGS

Embodiments of the invention will be better understood and readily apparent to one of ordinary skill in the art from the following written description, by way of example only, and in conjunction with the drawings, in which.

DETAILED DESCRIPTION

Figure 1:
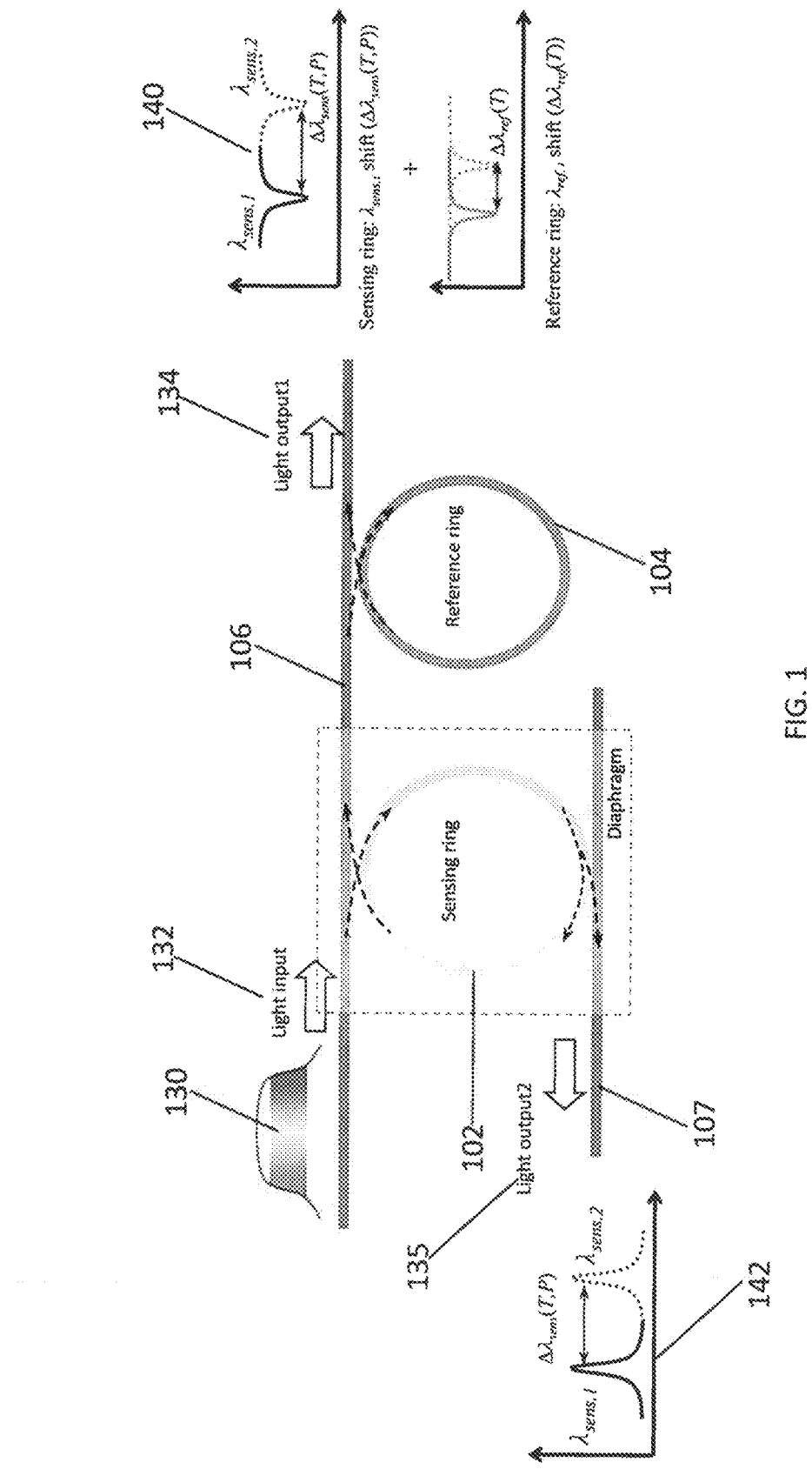
FIG. 1 is a schematic diagram of an optical pressure sensor according to an embodiment of the invention.

Embodiments of the present invention will be described, by way of example only, with reference to the drawings. Like reference numerals and characters in the drawings refer to like elements or equivalents.

Embodiments of the invention provide a micro-machined, CMOS compatible, optical pressure sensor having a double-ring resonator. In an exemplary implementation, the double ring comprises a sensing ring and pressure is recorded by measuring the sensing ring's resonance wavelength shift. The double ring also comprises a reference ring. Using the reference ring, wavelength shift induced by temperature fluctuations can be effectively compensated without additional temperature controllers. The response range and sensitivity of the pressure sensor can be altered by adjusting the size of the sensing area and the thickness of the diaphragm.

FIG. 1 is a schematic diagram of an optical pressure sensor according to an embodiment of the invention. The optical pressure sensor is built on a silicon-on-insulator (SOI) waveguide platform. The optical pressure sensor comprises two micro-rings: a sensing ring 102 and a reference ring 104, which are cascaded/coupled by a common bus waveguide 106. Optionally, there may be another bus waveguide 107 (i.e. an auxiliary waveguide) coupled to the sensing ring 102. Depending on the detection method used, both the bus waveguide 106 and auxiliary waveguide 107 can be used to detect the sensing ring's response. Pressure is recorded by measuring the sensing ring's resonance wavelength shift, $\Delta\lambda_{sens}(T,P)$. The sensing ring's resonance wavelength shift is affected by both applied pressure (P) and temperature (T). For the reference ring, the resonance wavelength shift $\Delta\lambda_{ref}(T)$ induced by temperature fluctuations (T) can be effectively compensated without additional temperature controllers.

Figure 2:
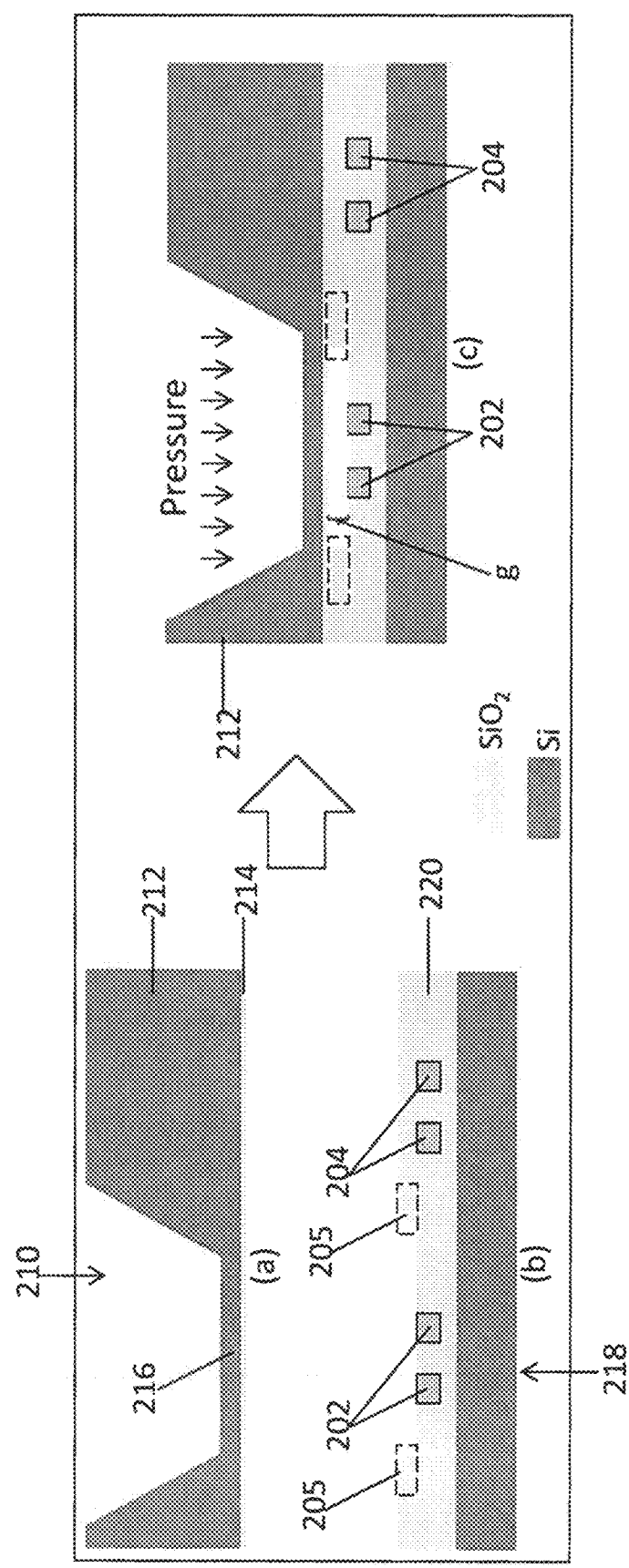
FIGS. 2(a), (b) and (c) show cross-sectional/side views of an optical pressure sensor (in part or as a whole) according to an embodiment of the invention.

FIGS. 2(a), (b) and (c) show cross-sectional views of an optical pressure sensor (in part or as a whole) according to an embodiment of the invention. FIG. 2(a) shows a top wafer portion 210 that includes a cladding layer 212 and a $SiO_2$ layer 214. The cladding layer 212 may be made of silicon. A portion of the cladding layer 212 is removed to form a diaphragm portion 216. The diaphragm portion 216 comprises a thin $SiO_2$ layer and a relatively thicker Si layer, as shown in FIG. 2(a).

FIG. 2(b) shows a bottom SOI wafer portion 218 comprising two micro-rings (sensing ring 202 and reference ring 204) and waveguides (not shown). The two micro-rings are fixed on the buried oxide (BOX) layer 220 of the SOI wafer portion 218. In FIG. 2(c) the top wafer portion 210 is wafer bonded to the bottom SOI wafer portion 218 to form an optical pressure sensor. The reference ring 204 is covered by the thick upper cladding layer 212 and the sensing ring 202 is exposed to the diaphragm portion 216. Optionally, the bottom SOI wafer portion 218 further, comprises a leakage channel 205 for air pressure balance. The presence of the leakage channel 205 allows contact-loaded pressure to be measured. On the other hand, the absence of the leakage channel 205 allows both surrounded air pressure and contact-loaded pressure to be measured. The presence or absence of the leakage channel 205 depends on the pressure sensor's application.

In an exemplary implementation, there is a narrow gap (g) between the sensing ring 202 and the diaphragm portion 216. Turning back to FIG. 1, when the light 130 from a broadband source is coupled into an input port 132, a large portion of the power passes through the common bus waveguide 106, while a small portion of the light passes through the sensing ring 102. Another small portion of the light is coupled to the reference ring 104 by its transmission spectrum before being guided to the output port 134. Through the final transmission spectrum at the output port 134, the wavelength shift information induced by the applied pressure can be obtained.

If the bus waveguide 107 is coupled to the sensing ring 102, the light output at the output port 135 is the reflection spectrum of the sensing ring 102. The reflection spectrum can be used to further'characterize the sensing ring's response, i.e. in addition to the transmission spectrum of the sensing ring 102 at the output port 134. Ideally, the peaks shown in graph 142 ($\lambda_{sens,1}$) are equal to the dips shown in graph 140 ($\lambda_{sens,1}$). The only difference is the absolute intensity, which does not affect the sensors' resolutions.

In embodiments of the invention, the pressure information is detected through a variation in the narrow gap (g), and optical read-out is obtained through the light spectrum. The high sensitivity of the device is mainly due to the detection principle in which detection is based on mechanical modulation of the evanescent field around the micro-ring resonator. Furthermore, due to the narrow gap (g), the mechanical modulation can be easily detected. In particular, the nano-waveguide based micro-ring provides an intense evanescent wave, and the ring configuration can greatly enhance the interaction period.

Due to the fixed micro-ring and waveguide design (where the waveguide is fixed within the substrate), the spacing between the sensing ring and the waveguide is not affected or deformed when the diaphragm is under pressure and deformed. This configuration provides embodiments of the invention with enhanced stability. In addition, if an auxiliary waveguide 107 is present, the spacing between the sensing micro-ring and the auxiliary waveguide 107 is not affected (does not vary) when a force is applied to the diaphragm.

The gap (g) between the sensing ring and the diaphragm is varied when a pressure is applied. Compressing the diaphragm (i.e. when pressure is applied on the diaphragm) causes buckling of the film and consequently vertical optical coupling variation between the sensing ring and the substrate. The decrease in the coupling gap increases the coupling coefficient (k) and causes the ring-diaphragm system to be tuned gradually. In particular, when pressure is applied on the diaphragm, due to the stress located over the diaphragm, the separation between the diaphragm and the waveguide is changed. Such out-of-plane motion of the diaphragm modulates the path length of the resonant optical field inside the cavity by modifying the effective refractive index ($\eta_{eff}(g)$) of the micro-ring waveguide.

Here, the effective index is given as:

$$n_{eff}(g) = k(\beta_0 + \beta_1 e^{-\sigma g}) = n_0 + n_1 e^{-\sigma g} \quad (1)$$

where k is the free space wavevector (k=2 π/λ), $\beta_0$ is the propagation constant of the free waveguide. $n_0$ and $n_1$ are the refractive index of the micro-ring and the substrate, respectively. σ represents an exponential factor and indicates that the effective index of the micro-ring ($n_{eff}(g)$) as a function of the air gap (g) between the micro-ring and the diaphragm surface. In particular, σ decays exponentially with the increase of the gap distance. Meanwhile, an increase of the effective index ($\Delta n_{eff}$) increases the optical path length of the ring resonator, leading to an increase of the resonance wavelength (αλ).

The effective index is derived as follows:

$$E_x = A \begin{cases} a_1 e^{k_s y} & y > 0 \\ a_2 e^{-k_a y} + a_3 e^{k_a y} & -g < y < 0 \\ \cos(k_c(y-g) + \phi) & -(g+h) < y < -g \\ a_4 e^{-k_a(y-g-h)} & y < -(g+h) \end{cases} \quad (2)$$

$$\sigma = 2k_a \ln(2) - \ln\left[P \frac{(k_a - k_s)(k_a^2 + k_c^2)}{(k_a + k_s)(k_a^2 - k_c^2)P + 2k_a k_c}\right] \quad (3)$$

$$\beta(g) = \beta_0 + \beta_1 e^{-\sigma g} \quad (4)$$

$$n_{eff} = k(\beta_0 + \beta_1 e^{-\sigma g}) = n_0 + n_1 e^{-\sigma g} \quad (5)$$

For a given reduced gap distance (Δg), the wavelength shift is given by:

$$\Delta\lambda = \frac{g_{om}(n_{eff})\lambda_0^2}{2\pi c} \Delta g \quad (6)$$

where $g_{om}(n_{eff})$ denotes the opto-mechanical coupling constant, $\lambda_0$ is the initial resonance wavelength, and c represents the light velocity in a vacuum.

Figure 3A:
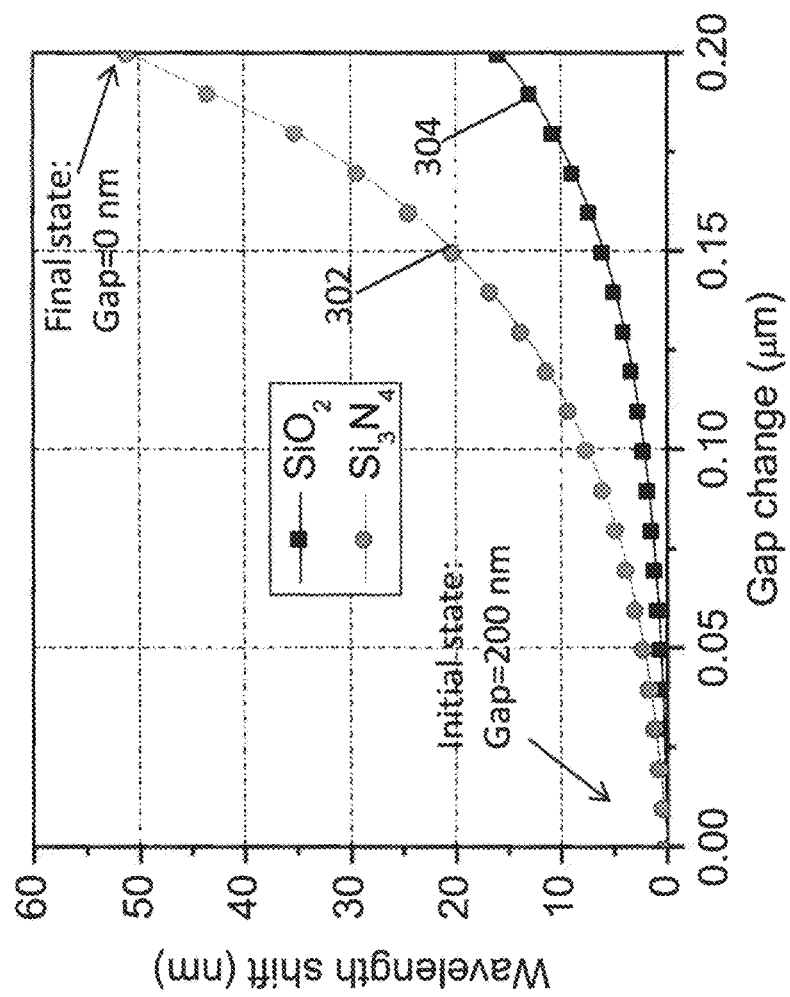
FIG. 3(a) is a graph showing the wavelength shift as a function of the gap change ($\Delta g$) with different diaphragm materials used in an embodiment of the invention.
Figures 3B, 4B:
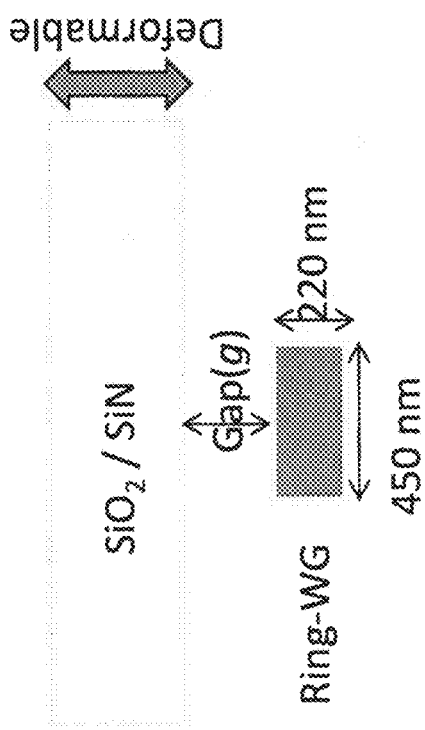
FIG. 3(b) shows a cross-sectional view of an optical pressure sensor according to an embodiment of the invention.
FIG. 4(b) shows the sensor performance of SiN diaphragms of various dimensions according to an embodiment of the invention.

FIG. 3(a) is a graph showing the wavelength shift as a function of the gap change (Δg) with different diaphragm materials, e.g. $SiO_2$ 302 and $Si_3N_4$ 304. Here, in the numerical simulation, the parameters of the micro-ring/waveguide used are as follows: the width of the core a=450 nm, the height b=220 nm, the sensing ring radius R=30 μm, as shown in FIG. 3(b). The diaphragm is formed with a thin-film layer (2 μm) of $SiO_2$ or $Si_3N_4$ on top of the Si substrate. The initial ring-diaphragm gap distance $g_0$=200 nm.

As seen from FIG. 3(a), for a particular gap change (Δg), a $Si_3N_4$ diaphragm presents a larger wavelength shift 304 as compared a $SiO_2$ diaphragm 302. For example, in the extreme case, when the gap change (Δg) reaches 0.2 μm, the maximum wavelength shift for a $Si_3N_4$ diaphragm is up to 50 nm. Such a response can be easily detected through changes in the optical spectrum. As a result, a diaphragm with a thin $Si_3N_4$ film (about 2 μm) is expected to provide better performance. Consequently, the following description, FIGS. 4(a)/4(c)/5, and FIGS. 4(b) and 6 relate to a diaphragm covered with 2 μm thick $Si_3N_4$ film.

Based on simulations, the optimized initial gap is found to be about 200 nm. A narrower gap provides higher sensitivity. However, in consideration of current fabrication techniques, a very narrow gap may not be easily achievable.

Figure 4A:
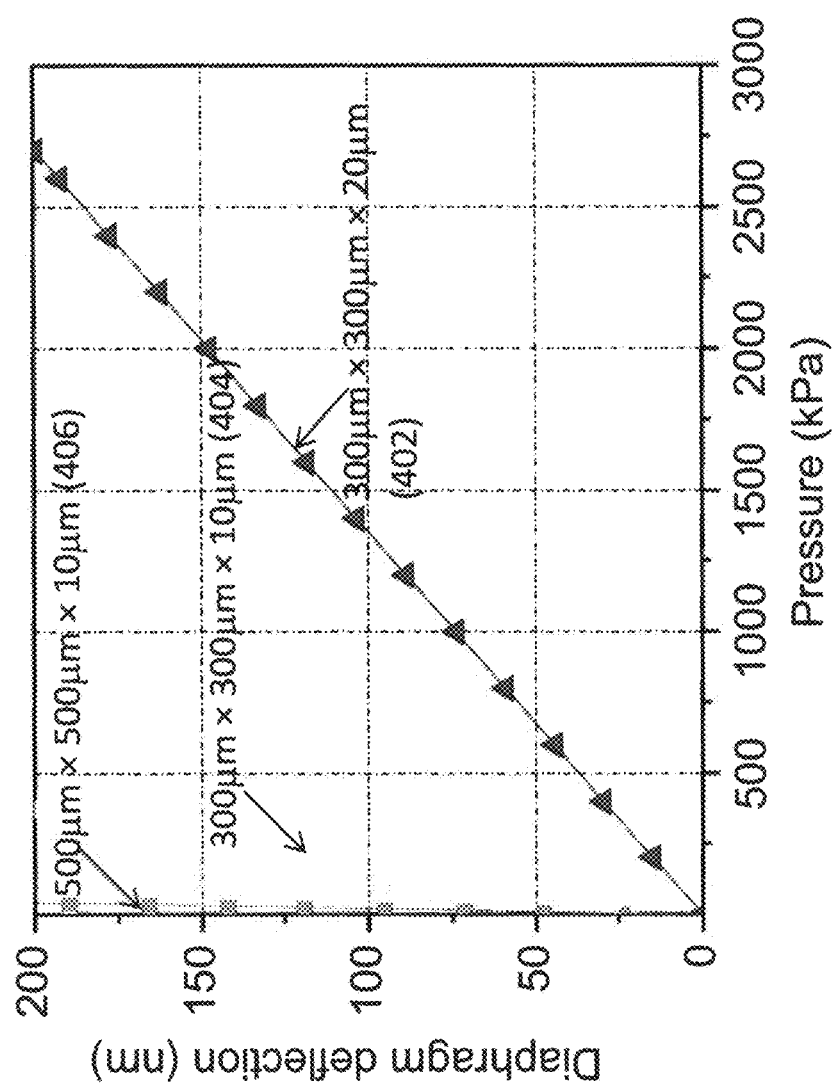
FIG. 4(a) is a graph showing diaphragm deflection response at different applied pressures for different diaphragm dimensions according to an embodiment of the invention.

The dimensions of the diaphragm also greatly affect the measurement range and sensitivity of the pressure sensor. FIG. 4(a) is a graph showing diaphragm deflection response at different applied pressures for different diaphragm dimensions. A smaller and thicker diaphragm provides a wider pressure range but a limited sensitivity, i.e. there is a trade-off between a wide measurement range and high sensitivity. For example, with reference to FIG. 4(a), for diaphragms having length and width of 300 μm (i.e. 300 μm×300 μm), a thicker diaphragm (e.g. 20 μm) 402 allows a wider measurement range compared to a thinner diaphragm (e.g. 10 μm) 404, since less diaphragm deflection occurs for a thicker diaphragm when under the same pressure loading. Furthermore, increasing the diaphragm dimensions can improve sensitivity. For instance, a sensor with a diaphragm dimension of 500 μm×500 μm×10 μm (length×width×height) 406 has a sensitivity of >33 μm/kPa. FIG. 4(b) shows the sensor performance (range/sensitivity) of SIN diaphragms of various dimensions.

Figure 4C:
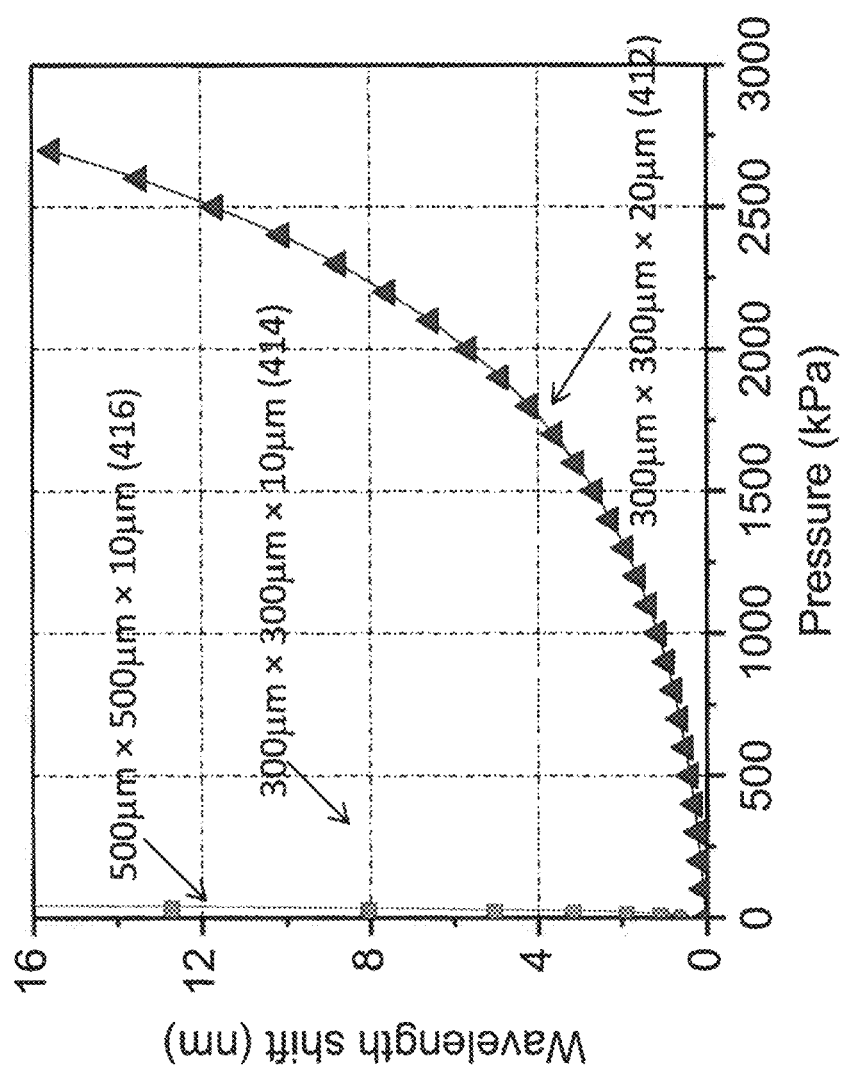
FIG. 4(c) is a graph showing wavelength shift versus applied pressure for three SiN diaphragms with different dimensions according to an embodiment of the invention.

FIG. 4(c) is a graph showing wavelength shift versus applied pressure for three SiN diaphragms with different dimensions 412/414/416. The pressure range is set according to the maximum diaphragm deflection (≤200 nm). As seen in FIG. 4(c), the wavelength shift increases exponentially with increasing applied pressure. For example, an applied pressure of 2.7 MPa leads to 16 nm wavelength shift for a sensor with a diaphragm dimension of 300 μm×300 μm×20 μm 412. The inventors have calculated that dependent on the coupling gap variation caused by a pressure loading, the wavelength/frequency varies with an average pressure sensitivity of about 0.5 m/kPa in a 2.7 MPa range for a sensor with a diaphragm dimension of 300 μm×300 μm×20 μm.

Analysis using resonator theory indicates that the wavelength shift can reach 50 nm when the ring-diaphragm coupling gap is tuned from 200 nm to 0 nm. The double-ring optical pressure sensor's sensitive response to diaphragm deformation shows that it is suitable to be implemented as an opto-mechanical sensor to measure pressure with high sensitivity, and also as other sensors for measuring mechanical load and displacement with high sensitivity. The strong opto-mechanical coupling effect has a strong response to diaphragm deformation, enabling higher efficiency in mechanical response. Embodiments of the invention advantageously provide stable and consistent optical performance as the optical sensing part is fixed and separated from the deformable diaphragm.

One challenge constantly faced by ring-resonator based sensors is temperature-dependent resonance shift, which is typically due to material properties. As a result, in the prior art, an additional temperature controller is required in order to improve the sensor performance and be less temperature-dependent.

The double-ring resonator based pressure sensor according to embodiments of the invention allows for in-situ temperature compensation, making the measurement relatively insensitive to temperature changes and eliminates the need for an external temperature controller. Assuming the resonant wavelength shifts are caused by the combination of diaphragm deflection and temperature change, the total shifts for the sensing and reference rings can be given by:

$$\Delta\lambda_{sens}(\Delta T) = \Delta\lambda_{sens}(\Delta T = 0) + \frac{\lambda_{sens}}{n_{sens\_g}} \kappa_{sens} \Delta T \quad (7)$$

and $$\Delta\lambda_{ref}(\Delta T) = \frac{\lambda_{ref}}{n_{ref\_g}} \kappa_{ref} \Delta T \quad (8)$$

where $\Delta\lambda_{sens}(\Delta T)$ and $\Delta\lambda_{ref}(\Delta T)$ are the total wavelength shifts (including the temperature effect) for the sensing and reference ring, respectively. $\Delta T$ refers to the temperature change, $\Delta\lambda_{sens}(\Delta T=0)$ is the shift due to the pressure induced diaphragm deflection. $\lambda_{sens}$, $n_{sens\_g}$ and $k_{sens}$ are resonant wavelength, group index and thermo-optic (TO) coefficient of the sensing ring, respectively; while $\lambda_{ref}$, $n_{ref\_g}$ and $K_{ref}$ are resonant wavelength, group index and TO coefficient of the reference ring, respectively. Combining equations (7) and (8), the desired sensing shift due to the pressure can be obtained, and expressed as:

$$\Delta\lambda_{sens}(\Delta T=0) = \Delta\lambda_{sens}(\Delta T) - k_1 \Delta\lambda_{ref}(\Delta T) \quad (9)$$

where the temperature compensation coefficient $k_1$ is:

$$k_1 = \frac{n_{ref\_g}}{n_{sens\_g}} \frac{\lambda_{sens}}{\lambda_{ref}} \frac{\kappa_{sens}}{\kappa_{ref}} \quad (10)$$

According to equation 9, the temperature dependence can be eliminated by a temperature drift correction term obtained from the reference ring.

Figures 5, 6:
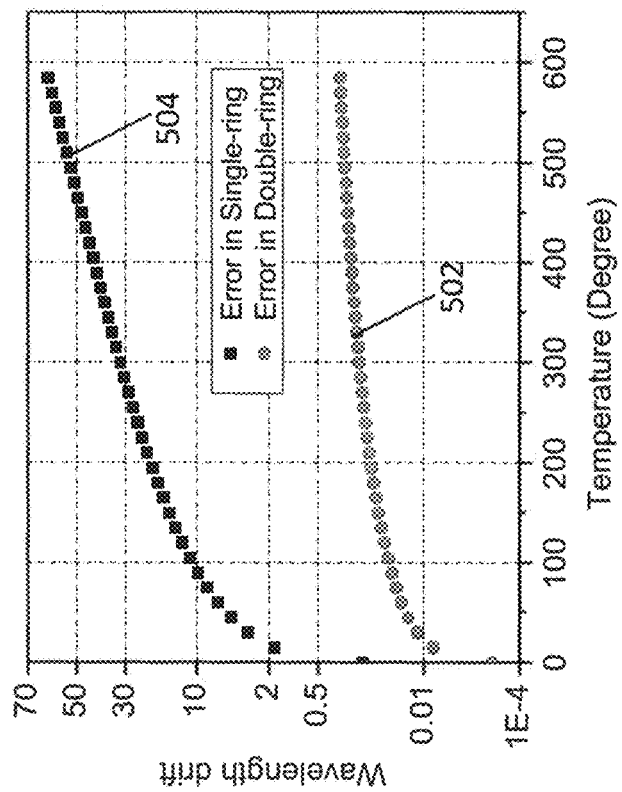
FIG. 5 is a graph comparing the temperature-induced wavelength shift errors in a single ring system and a double-ring system according to embodiments of the invention.
FIG. 6 provides a comparison of temperature-induced wavelength drift experienced by a single-ring system and a double-ring system according to embodiments of the invention.

FIG. 5 is a graph comparing the temperature-induced wavelength shift errors in a single ring system 504 and a double-ring system 502 according to embodiments of the invention. There is a notable reduction of temperature-induced wavelength shift error in the double-ring system 502 as compared to that of the single ring sensor 504. For instance, when the temperature rises to 600° C., the temperature-induced wavelength shift in the double-ring system 502 is 0.24 nm, which can be considered negligible, compared to the 62.93 nm wavelength shift in the single-ring system 504. FIG. 6 provides a comparison of temperature-induced wavelength drift experienced by a single-ring system and a double-ring system according to embodiments of the invention.

In an exemplary implementation, there is provided a micro-machined optical pressure sensor, comprising (i) a diaphragm configured to deform when a force is applied thereto and (ii) a sensing micro-ring spaced apart from the diaphragm by a gap, the gap being variable depending on the force applied on the diaphragm. The sensing micro-ring is configured to produce a resonance wavelength shift when the gap is varied, the resonance wavelength shift indicative of the force applied to the diaphragm. The sensor may further comprise a reference micro-ring spaced apart from the sensing micro-ring, the reference micro-ring configured to produce a reference resonance wavelength shift, the reference resonance wavelength shift indicative of the temperature of the sensor.

An effective resonance wavelength shift is derived from the resonance wavelength shift and the reference resonance wavelength shift, the effective resonance wavelength shift indicative of the force applied on the diaphragm independent of the temperature of the sensor.

The sensor may further comprise a waveguide, wherein the sensing micro-ring and the reference micro-ring are in optical communication with the waveguide. A broadband light source may be in optical communication with the waveguide for providing an optical spectrum from which the resonance wavelength shift and the reference resonance wavelength shift are derived.

Although the description above relates to a single optical pressure sensor, it is possible to combine multiple sensors to provide a sensor array.

It will be appreciated by a person skilled in the art that numerous variations and/or modifications may be made to the present invention as shown in the embodiments without departing from the spirit or scope of the invention as broadly described. The embodiments are, therefore, to be considered in all respects to be illustrative and not restrictive.

What is claimed is:

1. A micro-machined optical pressure sensor, comprising:
   a diaphragm configured to deform when a force is applied thereto;
   a sensing micro-ring spaced apart from the diaphragm by a gap, the gap being variable depending on the force applied on the diaphragm; and
   a reference micro-ring spaced apart from the sensing micro-ring, the reference micro-ring configured to produce a reference resonance wavelength shift, the reference resonance wavelength shift indicative of the temperature of the micro-machined optical pressure sensor;
   wherein the sensing micro-ring is configured to produce a resonance wavelength shift when the gap is varied, the resonance wavelength shift indicative of the force applied to the diaphragm,
   wherein the reference micro-ring is configured to compensate a temperature-dependent resonance shift within the resonance wavelength shift produced by the sensing micro-ring when the gap is varied.

2. The sensor as claimed in claim 1, further comprising a waveguide, wherein the sensing micro-ring and the reference micro-ring are in optical communication with the waveguide.

3. The sensor as claimed in claim 1, wherein an effective resonance wavelength shift is derived from the resonance wavelength shift and the reference resonance wavelength shift, the effective resonance wavelength shift indicative of the force applied on the diaphragm independent of the temperature of the sensor.

4. The sensor as claimed in claim 1, further comprising a waveguide, wherein the sensing micro-ring and the reference micro-ring are in optical communication with the waveguide.

5. The sensor as claimed in claim 4, further comprising a broadband light source in optical communication with the waveguide for providing an optical spectrum from which the resonance wavelength shift and the reference resonance wavelength shift are derived.

6. The sensor as claimed in claim 4, further comprising a substrate, wherein the sensing micro-ring and the waveguide are fixedly disposed within the substrate such that the spacing between the sensing micro-ring and the waveguide does not vary when force is applied to the diaphragm.

7. The sensor as claimed in claim 6, wherein the substrate comprises $SiO_2$.

8. The sensor as claimed in claim 1, wherein the diaphragm comprises $Si_3N_4$.

9. The sensor as claimed in claim 1, wherein the diaphragm comprises $SiO_2$.

10. The sensor as claimed in claim 6, wherein the substrate comprises a leakage channel for air pressure balance.

11. The sensor as claimed in claim 4, further comprising an auxiliary waveguide, wherein the sensing micro-ring is in optical communication with the auxiliary waveguide.

12. The sensor as claimed in claim 11, further comprising a broadband light source in optical communication with both the waveguide and the auxiliary waveguide for providing an optical spectrum from which the resonance wavelength shift and the reference resonance wavelength shift are derived.

13. The sensor as claimed in claim 12, further comprising a substrate, wherein the sensing micro-ring, the waveguide and the auxiliary waveguide are fixedly disposed within the substrate such that the spacings between the sensing micro-ring, the waveguide and the auxiliary waveguide do not vary when force is applied to the diaphragm.

14. The sensor as claimed in claim 2, further comprising a broadband light source in optical communication with the waveguide for providing an optical spectrum from which the resonance wavelength shift and the reference resonance wavelength shift are derived.

15. The sensor as claimed in claim 3, further comprising a waveguide, wherein the sensing micro-ring and the reference micro-ring are in optical communication with the waveguide.

16. The sensor as claimed in claim 15, further comprising a broadband light source in optical communication with the waveguide for providing an optical spectrum from which the resonance wavelength shift and the reference resonance wavelength shift are derived.

17. The sensor as claimed in claim 5, further comprising a substrate, wherein the sensing micro-ring and the waveguide are fixedly disposed within the substrate such that the spacing between the sensing micro-ring and the waveguide does not vary when force is applied to the diaphragm.

* * * * *